Figure 1:
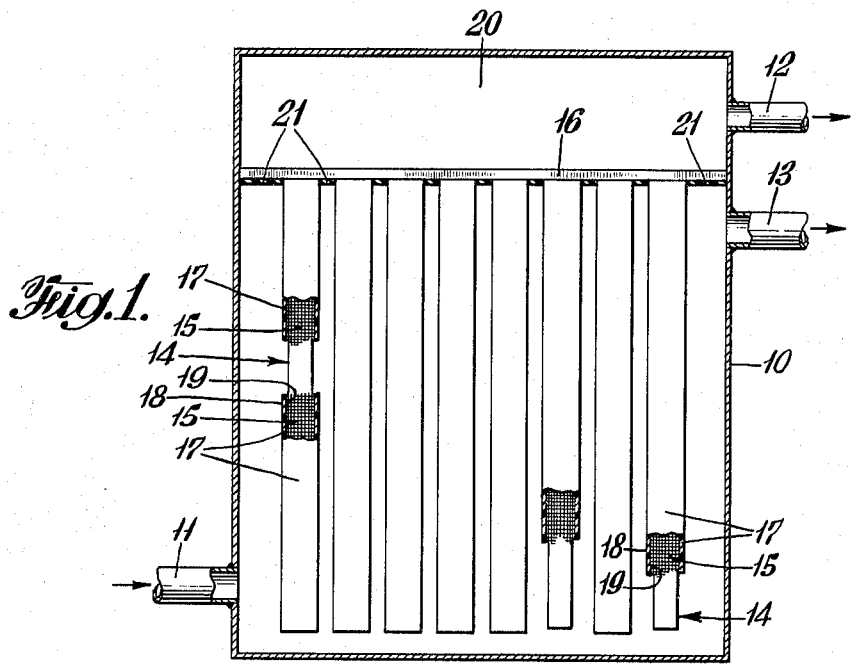

April 19, 1966

S. A. STERN ET AL 3,246,449

RECOVERY OF HELIUM

Filed June 9, 1959

INVENTORS
S. ALEXANDER STERN
PAUL H. MOHR
PAUL J. GAREIS

BY William F. Mesinger
ATTORNEY

United States Patent Office 3,246,449
Patented Apr. 19, 1966

3,246,449
RECOVERY OF HELIUM
Silviu A. Stern, Buffalo, Paul H. Mohr, Tonawanda, and Paul J. Gareis, Buffalo, N.Y., assignors to Union Carbide Corporation, a corporation of New York
Filed June 9, 1959, Ser. No. 819,033
16 Claims. (Cl. 55—16)

This invention relates to the recovery of helium gas from admixture with other gases. More specifically, it relates to a process of and apparatus for recovery of helium from a gas mixture containing at least one of the following gases: oxygen, nitrogen, carbon monoxide, argon and gaseous hydrocarbons.

Helium has found important applications in modern technology, such as for the filling of balloons and dirigibles, for arc welding, and in research. Furthermore, with the advent of the space age the demand for helium has increased to such an extent that a serious shortage of this gas has developed.

The recovery of helium from the type of gas mixtures in which it usually occurs is quite difficult. Most often, it is desired to recover helium from admixtures with low boiling gases such as oxygen, nitrogen, carbon monoxide, argon and gaseous hydrocarbons and their separation by low-temperature fractionation is extremely difficult and costly. For example, many natural gas fields contain less than 1% helium and its recovery by the fractionation technique is very expensive since it requires the condensation of a large fraction of the crude mixture.

Other known methods are even less feasible for commercial use. For example, it is known that the adsorption of helium by industrial adsorbents is negligible compared to that of the other natural gas components. As a result, the recovery of helium would necessitate the removal by adsorption of the bulk of the helium-bearing natural gas. This operation would involve prohibitively large quantities of adsorbents, as well as large and expensive equipment.

Still other methods proposed by the prior art are gaseous diffusion, and mass or sweep diffusion. The first method is based on the difference in the rates of diffusion of various gases through pores or small openings in a barrier, while the second method takes advantage of differences in the rates of diffusion of gases in some inert, readily condensable medium, such as steam. These methods are characterized by very low separation factors and have been applied economically only for the separation of special mixtures, for example of isotopes of uranium.

It has been proposed to recover helium by selective permeation through membranes, using thin, non-porous film forming materials such as polystyrene and ethyl cellulose. The chief disadvantage of such schemes is that the selectivity of these materials for helium is so low that an extremely large number of permeation stages are required to achieve the desired degree of separation. This not only entails a prohibitively high investment cost for the necessary equipment, but also involves extremely high power consumptions to operate the system.

Finally, it has been proposed to recover helium by diffusion through very thin silica capillaries. Although the selectivity of such capillaries for helium is very high, the rate of diffusion of the gas through the capillaries is extremely low. Consequently the separation must be carried out at high temperatures, and requires a prohibitively high number of capillaries.

A principal object of the present invention is to provide a new and novel system for separating helium from gas mixtures which is more efficient and less costly than heretofore proposed systems;

Another object is to provide a system for recovery of helium from low-boiling gas mixtures which operates on the principle of selective permeation, and which requires a relatively few number of stages to attain a desired degree of separation.

A further object of this invention is to provide a selective permeation system for recovery of helium from low-boiling gas mixtures, in which the permeable membranes afford a relatively high separation factor combined with a relatively high permeability.

Figure 2:
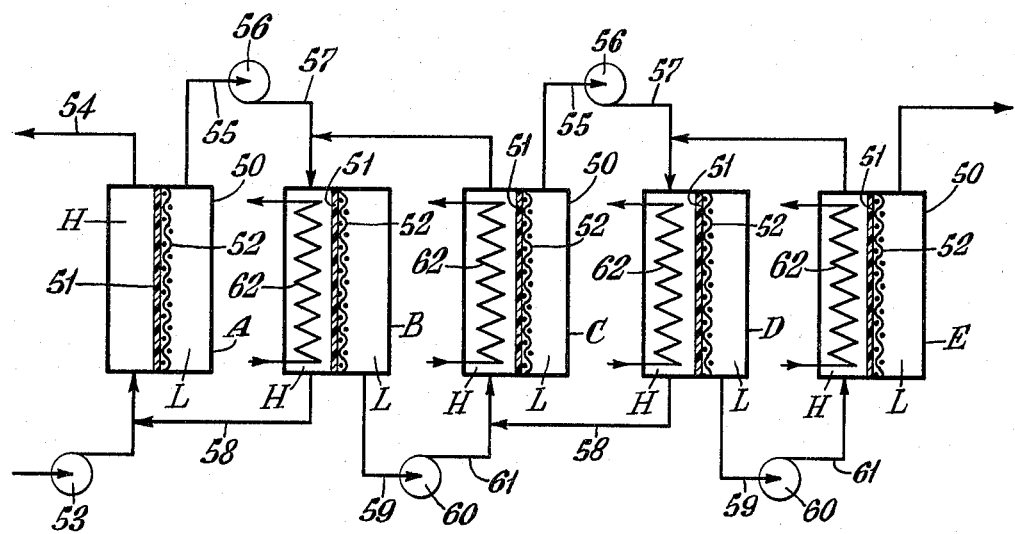

These and other objects and advantages of this invention will be apparent from the following description and accompanying drawings in which:

FIG. 1 is a view in vertical cross section of an exemplary permeation cell construction employing the principles of the invention; and FIG. 2 is a schematic flow diagram of several permeation cells arranged in a series relationship for practicing one embodiment of the invention.

The present invention is predicated on the discovery that the rate of permeation of helium through thin, non-porous, fluorinated plastic material is much faster than that of the other low-boiling gases which comprise the mixtures normally containing helium. The term "fluorinated material" as used herein is to be understood as including both partially and totally fluorinated materials. Among the membrane materials which have been found particularly suitable for practicing this invention are polytetrafluoroethylene, polytrifluorochloroethylene, polyvinyl fluoride, a copolymer of polytetrafluoroethylene and hexafluoropropylene commercially known as "Teflon 100 X," and a copolymer of vinylidene fluoride and hexafluoropropylene known commercially as "Viton A."

The selectivity of membranes for films for a given gaseous component in a binary mixture can be expressed in terms of a separation factor, which is defined as the ratio of the permeability constants of the pure components of the mixture. Table I lists the separation factors attainable for certain binary mixtures using membranes formed from previously proposed materials as well as the materials of the present invention.

TABLE I

Separation factors attainable by various membranes at 30° C.

| Membrane | Separation factor | |
|---|---|---|
| | He-CH$_4$ | He-N$_2$ |
| Vinylidene fluoride-hexafluoropropylene copolymer | 106 | 57 |
| Polytetrafluoroethylene | 86 | 25 |
| Polytrifluorochloro-ethylene | 400 | 260 |
| Polyvinyl fluoride | 290 | 95 |
| Polytetrafluoroethylene-hexafluoropropane copolymer | 81 | 53 |
| Polystyrene | 14.6 | 16 |
| Ethyl cellulose | 4.8 | 10.8 |
| Polyethylene | 3.3 | 9.1 |

It is apparent from this table that fluorinated plastic membranes afford remarkably high separation factors for helium, as compared with heretofore used organic membrane materials. For example, the separation factor for the reported fluorinated membrane compounds is 5.5 to 27.4 times that of the prior art materials for a helium-methane system and 1.6 to 16.2 times for a helium-nitrogen system.

The suitability of fluorinated material membranes for use in the system of the present invention is further enhanced by their high absolute permeability, as well as a high selectivity for helium. A high absolute permeability is of importance since it affords a measure of the total amount of gas that can be processed in a given time through a given film area. Although a membrane might be highly selective, if it has a low absolute permeability, it may not be economically utilized for large scale separation because of the relatively large membrane area that would be required. The absolute permeabilities of the membranes of the present invention are reported as a function of temperature in Table II by means of appropriate mathematical expressions. The permeability constants are in terms of cubic centimeters (STP) of gas permeated per second through one square centimeter of membrane, one centimeter thick under a pressure drop of 1 cm. Hg. Also R, the universal gas constant, is given in calories/° K. mole, and T the absolute temperature is given in ° K.

TABLE II

*Absolute permeabilities of various membrane materials*

POLYTETRAFLUOROETHYLENE $$P_{He} = (2.1 \times 10^{-6}) \exp\left(\frac{-3,100}{RT}\right) \frac{cm.^3 \, STP.-cm.}{sec.-cm.^2-cm. \, Hg}$$

$$P_{N_2} = (3.2 \times 10^{-5}) \exp\left(\frac{-6,700}{RT}\right) \frac{cm.^3 \, STP.-cm.}{sec.-cm.^2-cm. \, Hg}$$

$$P_{CH_4} = (2.2 \times 10^{-3}) \exp\left(\frac{-10,000}{RT}\right) \frac{cm.^3 \, STP.-cm.}{sec.-cm.^2-cm. \, Hg}$$

POLYTRIFLUOROCHLOROETHYLENE $$P_{He} = (3.0 \times 10^{-5}) \exp\left(\frac{-5,500}{RT}\right) \frac{cm.^3 \, STP.-cm.}{sec.-cm.^2-cm. \, Hg}$$

$$P_{N_2} = (1.6 \times 10^{-1}) \exp\left(\frac{-14,000}{RT}\right) \frac{cm.^3 \, STP.-cm.}{sec.-cm.^2-cm. \, Hg}$$

$$P_{CH_4} = (3.0 \times 10^{-2}) \exp\left(\frac{-13,000}{RT}\right) \frac{cm.^3 \, STP.-cm.}{sec.-cm.^2-cm. \, Hg};$$
$$T > 313° K.$$

$$P_{CH_4} = (3.2 \times 10_5) \exp\left(\frac{-23,000}{RT}\right) \frac{cm.^3 \, STP.-cm.}{sec.-cm.^2-cm. \, Hg};$$
$$T < 313° K.$$

VITON A $$P_{He} = (5.3 \times 10^{-4}) \exp\left(\frac{-7,600}{RT}\right) \frac{cm.^3 \, STP.-cm.}{sec.-cm.^2-cm. \, Hg}$$

$$P_{N_2} = (1.3) \exp\left(\frac{-14,700}{RT}\right) \frac{cm.^3 \, STP.-cm.}{sec.-cm.^2-cm. \, Hg}$$

$$P_{CH_4} = (8.0 \times 10^{-4}) \exp\left(\frac{-9,700}{RT}\right) \frac{cm.^3 \, STP.-cm.}{sec.-cm.^2-cm. \, Hg};$$
$$T > 331° K.$$

$$P_{CH_9} = (1.1 \times 10^{-4}) \exp\left(\frac{-20,600}{RT}\right) \frac{cm.^3 \, STP.-cm.}{sec.-cm.^2-cm. \, Hg};$$
$$T < 331° K.$$

POLYVINYL FLUORIDE $$P_{He} = (1.6 \times 10^{-4}) \exp\left(\frac{-8,200}{RT}\right) \frac{cm.^3 \, STP.-cm.}{sec.-cm.^2-cm. \, Hg}$$

$$P_{N_2} = (1.7 \times 10^{-3}) \exp\left(\frac{12,400}{RT}\right) \frac{cm.^3 \, STP.-cm.}{sec.-cm.^2-cm. \, Hg.}$$

$$P_{CH_4} = (3.0 \times 10^2) \exp\left(\frac{-20,300}{RT}\right) \frac{cm.^3 \, STP.-cm.}{sec.-cm.^2-cm. \, Hg}$$

TEFLON 100 X $$P_{He} = (5.9 \times 10^{-6}) \exp\left(\frac{-3,800}{RT}\right) \frac{cm.^3 \, STP.-cm.}{sec.-cm.^2-cm. \, Hg}$$

$$P_{N_2} = (2.8 \times 10^{-4}) \exp\left(\frac{-8,500}{RT}\right) \frac{cm.^3 \, STP.-cm.}{sec.-cm.^2-cm. \, Hg}$$

$$P_{CH_4} = (1.8 \times 10^{-4}) \exp\left(\frac{-8,500}{RT}\right) \frac{cm.^3 \, STP.-cm.}{sec.-cm.^2-cm. \, Hg}$$

The high absolute permeability of fluorinated membranes is further enhanced by the fact that they are preparable in very low thicknesses such as 0.1 mil, and if properly supported may be installed and used under pressure without danger of fracture. In a system involving gas separation by permeation through a nonporous membrane, it is desirable to use very thin membranes since the absolute rate of permeation varies inversely with the membrane thickness.

Another important consideration in providing a membrane material suitable for a gas recovery or separation system is chemical inertness to the gases which it will contact. The chemical inertness of fluorinated membranes is outstanding; these materials are known to be considerably less reactive than any of the known membrane materials such as ethyl cellulose and polystyrene. Furthermore, fluorinated membranes are not subject to poisoning by specific components of industrial gas streams, as for example are palladium membranes to sulfur-containing compounds.

A further important consideration is the physical stability and mechanical strength of membrane materials. The mechanical properties of the fluorinated membranes of the present invention are excellent; these membranes have been shown to retain their toughness and flexibility over wide ranges of temperature. By contrast, certain types of polystyrene are very brittle, while thin silica capillaries can break, crack or chip easily. Fluorinated membranes are also characterized by their unusual thermal stability, being suitable for continuous service at 500° F.

Broadly the process of the invention involves the steps of contacting a gas mixture containing helium with one side of a thin, non-porous membrane comprised essentially of a plastic, film-forming fluorinated material, and permeating a portion of the gas mixture through the membrane, this portion having a greater concentration of helium than the gas mixture. The permeated gas is removed from the opposite side of the membrane.

It is essential that the membranes of the invention be non-porous; that is, be free from pin-holes and other defects destroying their continuity. Discontinuity in the membrane large enough to allow gas to leak through rather than permeate through the body of the membrane almost completely destroys the selectivity of the membrane for helium. In this connection, it is emphasized that the gas recovery system of the present invention does not operate on the same principle as separation of gases by diffusion through porous media wherein advantage is taken of the difference in the rates of diffusion of the component gases through the pore structure. The present invention involves a permeation of the gas mixture through the body of the membrane rather than through pores present therein, and depends upon the fact that helium permeates through the membrane in this manner at a considerably faster rate than many other gases. The presence of pores in the membranes virtually destroys its selectivity by permitting large quantities of relatively unseparated gas to leak through.

As previously discussed, the selectivity of fluorinated membranes for helium in mixtures with low boiling gases such as oxygen, nitrogen, carbon monoxide and gaseous hydrocarbons is remarkably and unexpectedly high. The reasons for this characteristic are not fully understood, but the permeation of gases through membranes is known to be of a physicochemical nature and involves a solution of the gases at one interface of the membrane, the diffusion of the gases through and across the membrane, and the evaporation of the gas at the opposite interface of the membrane. The differences in the rates of permeation of certain gases are believed to be caused mainly by differences in the solubility and rate of diffusion of these gases in a given membrane.

The rates of permeation of different gases through a membrane are a measure of the absolute permeability of the memberane to these gases, and can be expressed by the following simple form of Fick's diffusion law.

$$q = \frac{P \cdot A \cdot \Delta p}{t}$$

where $q$ is the rate of permeation, P is the permeability constant, A is the area of the membrane, $\Delta p$ is the partial pressure of gradient across the membrane, and $t$ is the thickness of the membrane. Practical considerations require that the area of the membrane be kept at a minimum. Consequently, a high rate of permeation can be achieved if the permeability constant and the partial pressure gradient are large and the membrane is made as thin as possible.

The magnitude of the pressure gradient which can be applied across the membrane depends on such factors as the pressure of the feed gas mixture, the number of recovery or separation stages, the cost of compression, and the rupture limit of the membrane. The membrane itself does not have to sustain the entire pressure gradient by itself, but may be supported for example by porous metals or ceramic materials or by a metallic mesh or screen. The membranes of the present invention should be of a thickness less than about 5 mils, and preferably less than about 1 mil.

It has also been unexpectedly discovered that temperature has an important effect on the selectivity of fluorinated membranes for helium, as illustrated in the following Tables III through VIII.

TABLE III

*Separation factors for polytetrafluoroethylene at various temperatures*

| Tempera- | Separation factor | |
| ture,° C. | He-CH₄ | He-N₂ |
| --- | --- | --- |
| −30 | 1,540 | 113 |
| 0 | 320 | 48 |
| 30 | 86 | 25 |
| 100 | 10 | 9 |

TABLE IV

*Separation factors for polytrifluorochloroethylene at various temperatures*

| Tempera- | Separation factor | |
| ture,° C. | He-CH₄ | He-N₂ |
| --- | --- | --- |
| −30 | 440,000 | 8,800 |
| 0 | 10,000 | 1,200 |
| 30 | 400 | 260 |
| 100 | 18 | 18 |

TABLE V

*Separation factors for Viton A at various temperatures*

| Tempera- | Separation factor | |
| ture,° C. | He-CH₄ | He-N₂ |
| --- | --- | --- |
| −30 | 24,000 | 1,100 |
| 0 | 1,300 | 220 |
| 30 | 106 | 57 |
| 100 | 11 | 7 |

TABLE VI

*Separation factors for polyvinyl fluoride at various temperatures*

| Tempera- | Separation factor | |
| ture,° C. | He-CH₄ | He-N₂ |
| --- | --- | --- |
| −30 | 41,000 | 620 |
| 0 | 2,400 | 200 |
| 30 | 290 | 95 |
| 100 | 6.5 | 28 |

TABLE VII

*Separation factors for Teflon 100 X at various temperatures*

| Tempera- | Separation factor | |
| ture,° C. | He-CH₄ | He-N₂ |
| --- | --- | --- |
| −30 | 540 | 350 |
| 0 | 190 | 120 |
| 30 | 81 | 53 |
| 100 | 19 | 12 |

It is apparent from an examination of Tables III through VII that the separation factors for fluorinated membranes markedly increases as the membrane temperature is decreased. However, it has also been discovered that the absolute permeability increases with increasing temperature. Thus, for any given gas recovery system operating according to the present invention, the optimum permeation temperature will be determined by balancing the increased separation factors attainable at lower temperatures against the lower absolute permeability, as well as the investment and operating costs necessary to provide suitable equipment for the maintenance of the membranes and gas mixtures at the desired temperature level.

The advantages of the present invention are clearly illustrated by the following examples:

EXAMPLE I

In this example, a synthetic gas feed mixture of helium and mainly methane was supplied at a pressure of 190 p.s.i.g. and contacted with a single polytetrafluoroethylene membrane having an area of 7.1 sq. in. and a thickness of 1 mil. The membrane was supported by porous paper mat on a metal screen. A portion amounting to about 5% of the 190 p.s.i.g. gas mixture permeated through the membrane at 30° C., and was removed from the opposite side thereof as product gas at 0 p.s.i.g. The non-permeating portion of the gas mixture was discarded, and the gases had the following molar compositions:

| Component | Feed | Product |
| --- | --- | --- |
| He | 1.6 | 13.7 |
| CH₄ | 97.5 | 84.6 |
| C₂H₆ | 0.23 | 0.14 |
| N₂+CO | 0.51 | 0.9 |
| Impurities | Balance | Balance |

Inspection of this data reveals that the helium concentration in the product gas is about 8.6 times that of the feed gas. The helium concentration in the product gas may be further raised by an appropriate adjustment of the operating variables, such as by increasing the pressure of the feed gas, decreasing the fraction of the feed gas mixture permeating through the membrane, or decreasing the permeation temperature.

EXAMPLE II

In this example, a sample of natural gas was provided at a pressure of 220 p.s.i.g. and contacted with a single polytetrafluoroethylene membrane having an area of 7.1 sq. in. and a thickness of 1 mil. The membrane was supported by porous paper mat on a metal screen. A portion of the 220 p.s.i.g. natural gas permeated through the membrane at 30° C. and was removed from the opposite low pressure side thereof at 0 p.s.i.g. The non-permeating portion of the natural gas was discarded, and the permeated gases had the following molar compositions:

| Component | Feed | Poduct |
|---|---|---|
| He | 2.1 | 16.5 |
| $CH_4$ | 62.6 | 56.0 |
| $N_2 + CO$ | 25.1 | 21.8 |
| $C_2H_6$ | 4.4 | 2.0 |
| $C_3H_8$ | 4.7 | 1.5 |
| $C_3H_6$ | 0.3 | 0.2 |
| $C_5H_{12}$ | 0.6 | 0.1 |
| $CO_2$ | 0.2 | 1.8 |

Inspection of this data reveals that the helium concentration in the product gas is about 7.8 times that of the feed gas.

Fluorinated membranes are commercially available both without and with a plasticizer, which is usually a low-molecular weight fraction of the membrane-forming polymer. The effect of plasticizer is, in general, to increase the absolute permeability of the membranes. The mechanism is not fully understood, although it is possible that the crystallinity of the membrane is affected by the plasticizer. That is, the addition of a plasticizer to a fluorinated membrane may reduce its crystallinity and increase its permeability.

Referring now more specifically to the drawing, FIG. 1 is a view in vertical cross-section of an exemplary permeation cell construction employing the principles of the present invention, and includes gas-tight casing 10 having an inlet connection 11 for the feed gas mixture, an outlet 12 for the permeated gas product fraction, and an outlet 13 for the non-permeated waste gas fraction. A membrane support assembly 14 is provided, and may for example include wire screens fabricated in box-type assemblies 15 being supported at the upper end by a series of beams 16 extending longitudinally across the casing 10. Any desired number of beams 16 may be provided, and may for example be spaced at uniform intervals across the casing. The wire screen box assemblies 15 may be secured to the longitudinal support beams by any suitable means, as for example tack-welds or bolts. The number of wire box support assemblies 15 will be determined by the required membrane surface area, and the wire boxes may be example be spaced at uniform intervals along the longitudinal length of the casing. If desired, the wire box support assemblies 15 may be internally reinforced to withstand the pressure differential across the membranes. Thin, non-porous membranes 17 of fluorinated plastic material are secured to the outer surfaces of the wire screen box support assemblies 15 by suitable means such as an adhesive compound or tacks, and for example may be wrapped around the wire screen boxes prior to insertion and securing in the casing 10.

The helium gas-containing feed mixture is introduced through inlet connection 11 preferably at a positive pressure, and contacted with the high pressure or outer sides 18 of the fluorinated membranes 17. A portion of the feed gas permeates through the membranes 17 to the lower pressure side 19 thereof, and flows upwardly through the inside of the wire screen box assemblies 15 to the low pressure product gas manifold 20 of the perameation cell. This manifold may be gas-tightly separated from the high pressure side of the cell by sheets 21 extending transversely across the permeation cell between the ends of the wire screen box support assemblies 15. Similar transverse sheets 21 are provided to separate the product manifold 20 from the feed gas and waste gas sections of the cell. Transverse sheets 21 may for example be secured to longitudinal support members 16 by welded joints. The low pressure permeated gas product fraction collected in manifold 20 is discharged from casing 10 through outlet 12 for further use as desired, and the higher pressure non-permeated waste gas fraction is discharged through outlet 13.

Due to the high selectivity of the fluorinated membranes of this invention, substantial recoveries of helium may be made in only one stage of permeation. In many cases, however, it is desired to obtain a higher concentration of the desired gas than is possible to obtain in one stage of permeation, as for example, where the desired gas is present in the feed gas mixture in a very small concentration. In such cases, a multi-stage system may be advantageously employed.

Referring now to FIG. 2, a system for recovery of helium is illustrated which comprises five permeation stages, although any desired number of stages may be provided. Each stage has been designated by the letters A, B, C, D, and E, respectively, and in its simplest form comprises a casing 50 divided by a thin, non-porous membrane 51 composed of a fluorinated material, into a high pressure portion H and low pressure portion L. A perforated support 52, which may be wire screen, is arranged on the low pressure side of the membrane to prevent its collapse when placed under pressure. A feed gas mixture which may contain a very low concentration of helium, e.g. natural gas containing 1% helium, is compressed by means of compressor 53 to any desired pressure, and contacted with the high pressure side of the membrane in the first permeation stage A. The opposite side of the membrane is maintained at some lower pressure such as atmospheric. A portion of the feed gas permeates through the membrane to the lower pressure side thereof, and has a higher concentration of helium than the unpermeated portion of the feed gas.

The staging may be accomplished as follows: The unpermeated gas fraction is discharged from the high pressure portion H of first stage A through conduit 54 for further use or discharge to the atmosphere, as desired. The permeated portion of the original feed gas mixture is withdrawn from the low pressure side of first stage A through conduit 55, recompressed by means of compressor 56, and delivered to the high pressure side of the second stage B by means of conduit 57. In the second stage B, the same process is repeated. That is, a portion of the entering gas stream permeates from the higher to the lower pressure side of the membrane, and the unpermeated portion is recycled from the high pressure side of second stage B through conduit 58. The gas permeating through the membrane of second stage B is withdrawn from the lower pressure side L through conduit 59, recompressed by compressor 60, and circulated to the high pressure side H of stage C by conduit 61. The same process is repeated in stages C, D and F, the unpermeated gas from the high pressure side of each stage being recycled to the preceding stage, while the helium-enriched gas from the lower pressure side of each stage is circulated with recompression if desired to the high pressure side of the next succeeding stage for further enrichment.

As previously discussed, it has been discovered that the separation factor for helium-containing gas mixtures obtained with fluorinated membranes increases with decreasing temperature, and also that the absolute permeability decreases with decreasing temperature. The present invention thus provides a method of and apparatus for advantageously using these characteristics in a staged permeation system, by maintaining succeeding stages at progressively decreasing temperatures. That is, the temperatures in succeeding stages with respect to helium concentration, are maintained at progressively lower values. In this manner, the advantage afforded by increased separation factor at decreasing temperatures is utilized, and the simultaneous decrease in absolute permeability is not limiting to the overall process since the mass of gas circulating in succeeding stages is progressively decreasing. This temperature adjustment may be obtained by any of the numerous methods known to the refrigeration art, and as illustrated in FIG. 2 is accomplished by means of refrigerating coils. Thus, coils 62 may be provided in the high pressure section H of stages B, C, D and E, and a refrigerating fluid such as ammonia, carbon dioxide and the like may be circulated therethrough to cool the gas mixture flowing through the stages. The degree of cooling may, for example, be controlled by regulating the quantity of refrigerant circulating through the coils so that progressively more refrigerant would be circulated in succeeding stages.

The same objective may be accomplished by another embodiment of this invention without adjusting the temperatures of the various stages, by using fluorinated membranes of different compositions. Thus, the first or first few stages may utilize polytetrafluoroethylene membranes which exhibit a relatively high absolute permeability (see Table II) and reasonable separation factors (see Table I) for mixtures of helium and the aforementioned low-boiling gases. Succeeding stages may, for example, utilize polytrifluorochloroethylene membranes, which possess much higher selectivity but lower permeability than polytetrafluoroethylene for helium.

A helium recovery system according to the present invention may be combined with known separation systems. For example, the helium content in the crude feed gas mixture could be raised to a desired level in one or several permeation stages, and the final separation of the helium-containing product gas could be effected by means of low-temperature distillation, solvent extraction, adsorption or other appropriate methods.

It is to understood that the term "non-porous membrane composed essentially of plastic, film-forming fluorinated material" as used herein includes materials obtained by any method that will provide an effective amount of fluorine in the membrane. Such methods include deriving polymers from fluorinated monomers, and fluorinating a polymeric substance either before or after processing the substance into a membrane. Alternatively, a fluorinated plasticizing material may be incorporated in the membrane. Also, organic-inorganic membrane materials may be employed, as for example organosiloxanes, and these materials may be provided with the required amount of fluorine by the above-described methods. As a further variation, coatings of fluorinated materials may be applied on highly porous supports such as glass cloth and specially treated metals, as well as fluorinated films deposited in porous matrices.

Although the preferred embodiments have been described in detail, it is contemplated that modifications of the process and apparatus may be made and that some features may be employed without others, all within the spirit and scope of the invention as set forth herein.

What is claimed is:

1. A multi-stage process for the recovery of helium from a gas mixture comprising helium and at least one gaseous hydrocarbon in which a plurality of permeation stages are arranged in series relationship, each stage comprising a high pressure side and a lower pressure side being separated by a thin, non-porous membrane comprised essentially of a plastic film-forming, fluorinated material, comprising the steps of providing the feed gas mixture under suitable pressure and contacting it with the high pressure side of a first permeation stage; permeating a first portion of said gas mixture through the first stage membrane comprised essentially of polytetrafluoroethylene from the higher to the lower pressure side thereof, said first portion having a greater concentration of helium than the gas mixture; and thereafter consecutively permeating the helium enriched portions of said gas mixture through succeeding permeation stages in an analogous manner until the desired concentration of helium is obtained, the membrane of at least one succeeding stage being comprised essentially of polytrifluorochloroethylene.

2. Apparatus for the separation of a gas mixture by permeation comprising a plurality of permeation stages arranged in a series relationship, each stage comprising a high pressure side and a low pressure side being separated by a thin, non-porous, plastic membrane comprised essentially of a film-forming material selected from the group consisting of polytetrafluoroethylene, polytrifluorochloroethylene, a copolymer of polytetrafluoroethylene and hexafluoropropylene, and a copolymer of vinylidene fluoride and hexafluoropropylene; means for providing the feed gas mixture under suitable pressure and contacting it with the high pressure side of a first permeation stage; means for passing a first portion of said feed gas mixture having permeated through the first stage membrane, from the lower pressure side of such stage to the higher pressure side of a second stage; means for passing a portion of said feed gas mixture having permeated through each succeeding stage membrane to the high pressure side of the next stage; means for discharging an enriched product gas portion from the lower pressure side of the last permeation stage; and refrigerating means for controlling the temperatures of the membranes so that each membrane is cooler than the membrane of the preceding stage with respect to gas mixture flow.

3. Apparatus for the separation of a gas mixture by permeation comprising a plurality of permeation stages arranged in a series relationship, each stage comprising a high pressure side and a low pressure side being separated by a thin, non-porous membrane composed essentially of a plastic film-forming, fluorinated material; means for providing the feed gas mixture under suitable pressure and contacting it with the high pressure side of a first permeation stage, the membrane of such stage being composed essentially of polytetrafluoroethylene; means for passing a first portion of said feed gas mixture having permeated through the first stage membrane, from the lower pressure side of such stage to the higher pressure side of a second stage; means for passing a portion of said feed gas mixture having permeated through each succeeding stage membrane to the higher pressure side of the next stage; the membrane of at least one stage succeeding said first stage being composed essentially of a member selected from the group consisting of a copolymer of vinylidene fluoride and hexafluoropropylene and polytrifluorochloroethylene; and means for discharging an enriched product gas portion from the lower pressure side of the last permeation stage with respect to gas mixture flow.

4. Apparatus for the separation of a gas mixture by permeation comprising a plurality of permeation stages arranged in a series relationship, each stage comprising a high pressure side and a low pressure side being separated by a thin, non-porous, plastic membrane comprised essentially of a film-forming material selected from the group consisting of polytetrafluoroethylene, polytrifluorochloroethylene, a copolymer of polytetrafluoroethylene and hexafluoropropylene, and a copolymer of vinylidene fluoride and hexafluoropropylene; means for providing the feed gas mixture under suitable pressure and contacting it with the high pressure side of a first permeation stage, the membrane of said first permeation stage having a higher absolute permeability and a lower separation factor than membranes of succeeding permeation stages; means for passing a first portion of said feed gas mixture having permeated through the first stage membrane, from the lower pressure side of such stage to the higher pressure side of a second stage; means for passing a portion of said feed gas mixture having permeated through each succeeding stage membrane to the higher pressure side of the next stage; and means for discharging an enriched producct gas portion from the lower pressure side of the last permeation stage with respect to gas mixture flow.

5. A process for recovering helium from a gas mixture comprising helium and at least one gaseous hydrocarbon, comprising the steps of:
(1) contacting said gas mixture with one side of a thin, non-porous, plastic membrane comprised essentially of a film-forming material selected from the group consisting of a polytetrafluoroethylene, polytrifluorochloroethylene, a copolymer of polytetrafluoroethylene and hexafluoropropylene, and a copolymer of vinylidene fluoride and hexafluoorpropylene;
(2) permeating a portion of said gas mixture through said membrane, the permeated portion containing a greater concentration of helium than the gas mixture; and
(3) removing the permeated gas from the opposite side of said membrane.

6. The process according to claim 5 wherein the gaseous hydrocarbon gas is selected from the group consisting of methane and natural gas.

7. The process according to claim 5 wherein the membrane has a thickness of less than about 1 mil.

8. A process for the recovery of helium from a gas mixture comprising helium and at least one gaseous hydrocarbon, comprising the steps of:
(1) flowing said gas mixture, maintained under a predetermined pressure, in contact with one side of a thin, non-porous, plastic membrane comprised essentially of a film-forming material selected from the group consisting of polytetrafluoroethylene, polytrifluorochloroethylene, a copolymer of polytetrafluoroethylene and hexafluoropropylene, and a copolymer of vinylidene fluoride and hexafluoropropylene;
(2) maintaining the opposite side of such membrane at a pressure lower than the pressure on the first-mentioned membrane side;
(3) permeating a portion of said gas mixture through said membrane from the high to the low pressure side thereof, said portion containing a greater concentration of helium than the gas mixture; and
(4) removing the permeated gas from the lower pressure side of said membrane.

9. A multi-stage process for the recovery of helium from a feed gas mixture comprising helium and at least one gaseous hydrocarbon, in which a plurality of permeation stages are arranged in series relationship, each stage comprising a high pressure side and a low pressure side separated by a thin, non-porous, plastic membrane comprised essentially of a film-forming material selected from the group consisting of polytetrafluoroethylene, polytrifluorochloroethylene, a copolymer of polytetrafluoroethylene and hexafluoropropylene, and a copolymer of vinylidene fluoride and hexafluoropropylene, comprising the steps of:
(1) supplying said feed gas mixture under suitable pressure and contacting it with the high pressure side of a first permeation stage;
(2) permeating a first portion of said gas mixture through the first stage membrane from the high to the low pressure side thereof, said first permeated portion containing a greater concentration of helium than the feed gas mixture;
(3) passing said first permeated portion of gas from the low pressure side of said first permeation stage to the high pressure side of a second permeation stage, and contacting such first permeated portion of gas with the second stage high pressure side;
(4) permeating a portion of said first permeated portion of gas through the second stage membrane from the high to the low pressure side thereof, said second permeated portion containing a greater concentration of helium than said first permeated portion; and
(5) thereafter consecutively permeating portions of said second permeated portion of gas through succeeding permeation stages in an analogous manner until the desired concentration of helium is obtained.

10. The process according to claim 9 wherein each succeeding permeation stage is maintained at a progressively lower temperature than the last preceding stage.

11. The process according to claim 9 wherein the membrane of said first permeation stage has a higher absolute permeability and a lower separation factor than membranes of succeeding permeation stages.

12. A process for recovering helium from a gas mixture comprising helium and at least one other gas selected from the group consisting of methane and natural gas, comprising the steps of:
(1) contacting said gas mixture with one side of a thin, non-porous, plastic membrane of film-forming polytetrafluoroethylene,
(2) permeating a portion of said gas mixture through said membrane, the permeated portion containing a greater concentration of helium than the gas mixture, and
(3) removing the permeated gas from the opposite side of said membrane.

13. A process according to claim 12 wherein the membrane has a thickness of less than about 1 mil.

14. A process for the recovery of helium from a gas mixture comprising helium and at least one other gas selected from the group consisting of methane and natural gas, comprising the steps of:
(1) flowing said gas mixture, maintained under a predetermined pressure in contact with one side of a thin, non-porous, plastic membrane comprised essentially of film-forming polytetrafluoroethylene,
(2) maintaining the opposite side of such membrane at a pressure lower than the pressure on the first mentioned membrane side,
(3) permeating a portion of said gas mixture through said membrane from the high to the low pressure side thereof, said permeated portion containing a greater concentration of helium than the gas mixture, and
(4) removing the permeated gas from the lower pressure side of said membrane.

15. A multi-stage process for the recovery of helium from a feed gas mixture comprising helium and at least one other gas selected from the group consisting of methane and natural gas, in which a plurality of permeation stages are arranged in series relationship, each stage comprising a high pressure side and a low pressure side separated by a thin, non-porous, plastic membrane comprised essentially of film-forming polytetrafluoroethylene, comprising the steps of:
(1) supplying said feed gas mixture under suitable pressure and contacting it with the high pressure side of a first permeation stage;
(2) permeating a first portion of said gas mixture through the first stage membrane from the high to the low pressure side thereof, said first permeated portion containing a greater concentration of helium than the feed gas mixture;
(3) passing said first permeated portion of gas from the lower pressure side of said first permeation stage to the higher pressure side of a second permeation stage, and contacting such first permeated portion of gas with the second stage high pressure side;
(4) permeating a portion of said first permeated portion of gas through the second stage membrane from the high to the low side thereof, said second permeated portion containing a greater concentration of helium than said first permeated portion; and
(5) thereafter consecutively permeating portions of said second permeated portion of gas through succeeding permeation stages in an analogous manner until the desired concentration of helium is obtained.

16. A process according to claim 15 wherein each succeeding permeation stage is maintained at a progressively lower temperature than the last preceding stage.

References Cited by the Examiner

UNITED STATES PATENTS

| | | |
|---|---|---|
| 2,540,152 | 2/1951 | Weller. |
| 3,010,536 | 11/1961 | Plurien et al. |
| 3,019,853 | 2/1962 | Kohman et al. |
| 3,172,741 | 3/1965 | Jolley _____ 55—16 |

OTHER REFERENCES

Dow Bulletin, "Saran Resin F–120" Coatings Technical Service, Dow Chemical Co., Plastics Dept., Midland, Michigan, November 1954, p. 5. (Copy in Interference File 88,833.)

REUBEN FRIEDMAN, *Primary Examiner.*

HERBERT L. MARTIN, WALTER BERLOWITZ, WESLEY S. COLE, *Examiners.*